United States Patent
Li et al.

(10) Patent No.: US 7,369,345 B1
(45) Date of Patent: May 6, 2008

(54) MOBILE HARD DISK DRIVE FREE FALL DETECTION AND PROTECTION

(75) Inventors: Yunfeng Li, San Jose, CA (US); Erhard Schreck, San Jose, CA (US); Wei Guo, Fremont, CA (US); Tim Glassburn, Milpitas, CA (US); Mark Heimbaugh, Pleasonton, CA (US); William Flynn, San Jose, CA (US); Oliver Northrup, Mountain View, CA (US); John E. Scura, Paso Robles, CA (US); Lin Guo, Saratoga, CA (US); Xiaokun Chew, San Juan Capistrano, CA (US)

(73) Assignee: Maxtor Corporation, Longmount, CO (US)

( * ) Notice: Subject to any disclaimer, the term of this patent is extended or adjusted under 35 U.S.C. 154(b) by 321 days.

(21) Appl. No.: 11/292,831

(22) Filed: Dec. 2, 2005

Related U.S. Application Data

(60) Provisional application No. 60/633,052, filed on Dec. 3, 2004, provisional application No. 60/632,915, filed on Dec. 3, 2004.

(51) Int. Cl.
*G11B 5/54* (2006.01)
*G11B 21/12* (2006.01)
(52) U.S. Cl. .................... 360/75; 360/73.03
(58) Field of Classification Search .......... None
See application file for complete search history.

(56) References Cited

U.S. PATENT DOCUMENTS

| | | | |
|---|---|---|---|
| 4,745,564 A | 5/1988 | Tennes et al. | |
| 5,299,075 A | 3/1994 | Hanks | |
| 5,521,772 A * | 5/1996 | Lee et al. | 360/75 |
| RE35,269 E | 6/1996 | Comerford | |
| 5,663,847 A | 9/1997 | Abramovitch | |
| 5,777,815 A | 7/1998 | Kasiraj et al. | |
| 5,835,298 A | 11/1998 | Edgerton et al. | |
| 5,982,573 A | 11/1999 | Henze | |
| 6,101,062 A | 8/2000 | Jen et al. | 360/75 |
| 6,304,406 B1 * | 10/2001 | Douglas et al. | 360/73.03 |
| 6,417,979 B1 | 7/2002 | Patton et al. | |
| 7,059,182 B1 * | 6/2006 | Ragner | 73/200 |
| 7,071,597 B2 * | 7/2006 | Lee et al. | 310/329 |
| 7,191,089 B2 * | 3/2007 | Clifford et al. | 702/141 |
| 2004/0246617 A1 * | 12/2004 | Ehrlich | 360/73.03 |
| 2005/0119795 A1 | 6/2005 | Morisada | |
| 2006/0152842 A1 | 7/2006 | Pasolini et al. | |

FOREIGN PATENT DOCUMENTS

WO    WO 2004/041086    5/2004

* cited by examiner

*Primary Examiner*—Tan Dinh
*Assistant Examiner*—James L Habermehl
(74) *Attorney, Agent, or Firm*—Westman, Champlin & Kelly

(57) ABSTRACT

A system provided for protecting a disk drive from impact damages. More specifically, a disk drive is provided that includes an accelerometer interconnected to a printed circuit board that detects free fall of the disk drive. In addition, the velocity of spinning disks of the disk drive is also monitored to assess changes in velocity thereof that may indicate the presence of a tumbling condition. Furthermore, the change in acceleration measured by the accelerometer is monitored to prevent false indications of free fall due to common vibrations. Thus an enhanced system is provided that protects disk drives from the effect of free falls under a wide variety of conditions and allowing for drops from shorter distances to be identified.

56 Claims, 8 Drawing Sheets

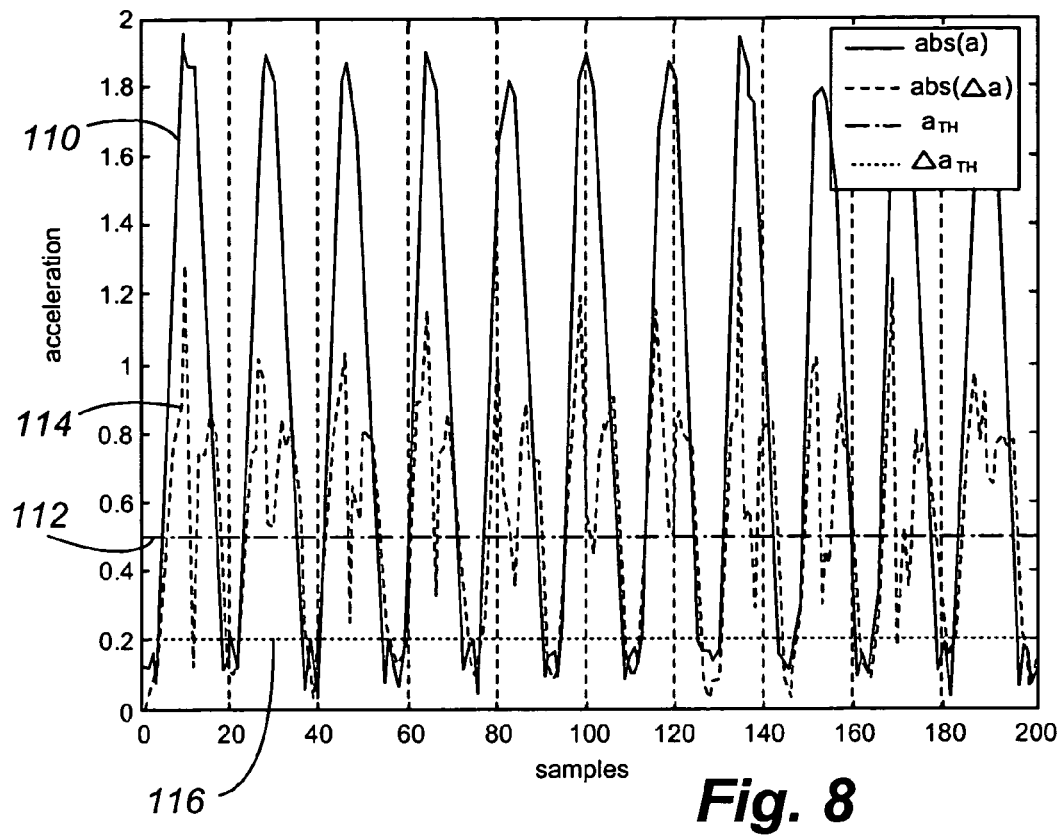
Fig. 8
Fig. 9
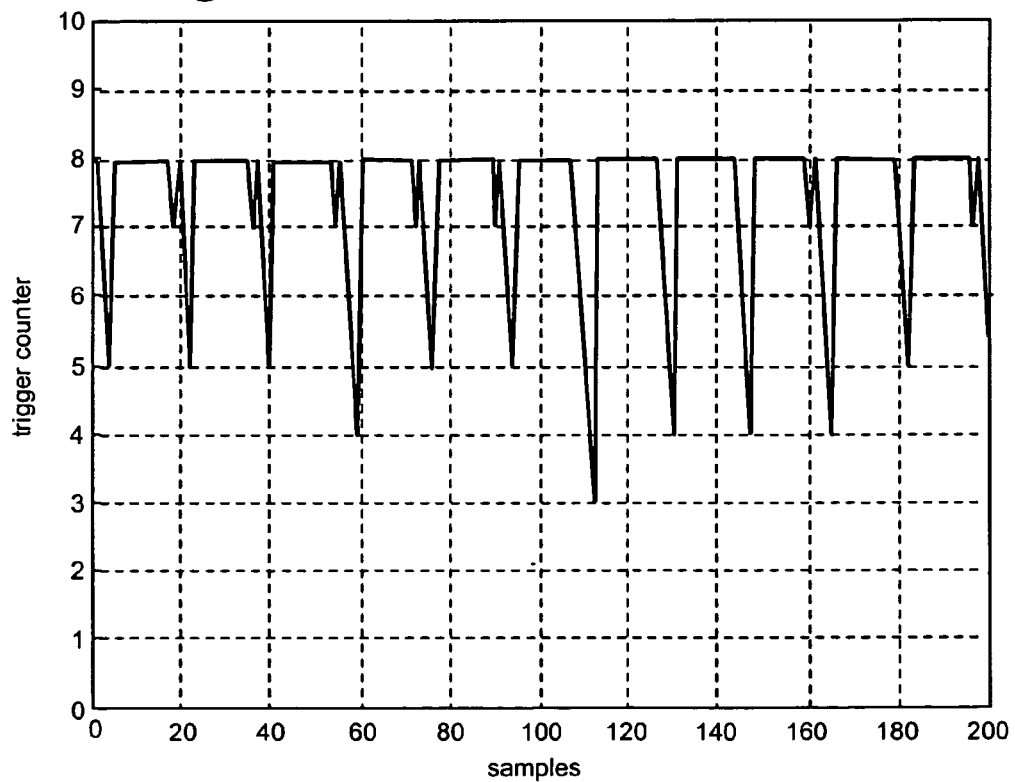

MOBILE HARD DISK DRIVE FREE FALL DETECTION AND PROTECTION

This application claims the benefit of U.S. Provisional Patent Application Ser. No. 60/633,052 and No. 60/632,915 filed Dec. 3, 2004, both of which are incorporated by reference in their entireties herein. This application is also related to U.S. patent application entitled "ZERO-G OFFSET IDENTIFICATION OF AN ACCELEROMETER EMPLOYED IN A HARD DISK DRIVE," filed Dec. 2, 2005, which is incorporated by reference in its entirety herein.

FIELD OF THE INVENTION

The present invention relates generally to disk drives, and more particularly, a method and apparatus for protecting rotating media and read/write heads of the disk drive from mechanical shock events caused by an impact following a fall. More specifically, the present invention repositions the actuator arm off the disk or over a crash zone when free fall and/or tumbling motion is detected.

BACKGROUND OF THE INVENTION

Conventional disk drives employ a servo system that controls the radial position of an actuator arm relative to the surface of a rotating recording disk. The actuator arm supports a read/write head or transducer above a disk surface and ideally over the center of a selected track on the disk surface. For positioning purposes, the read/write head senses servo information embedded in the disk, which is then used to develop a position error signal. The error signal is then used to adjust the position of the read/write head in a direction to reduce the magnitude of the error for purpose of track following. The servo system is also utilized to move the read/write head from one track to another track.

At one time, disk drives were employed primarily within desktop computers, where the disk drives operated in a static environment within the computer on a desktop or table. The computer was in a stable position and there was little likelihood that disk drive would experience shock loading from impacts as a result of being dropped. Today, an increasing percentage of disk drives are being used in portable electronic devices, including laptop computers, notebook computers, palm-held devices, personal digital assistants, music players and other portable electronic devices. A primary problem associated with contemporary designs of such disk drives concerns shock-induced damage from the impact of a falling portable electronic device colliding with a surface. For example, when a device containing a small disk drive falls from a desk or a user's hand onto a hard surface, the shock pulse magnitude generated can be hundreds or thousands times the acceleration of gravity. Shock induced damage to the disk drive or its components is typically less a problem when the portable electronic device is turned off. When turned off, the actuator arm and head element are securely parked at a position off the surface of the disk or on a crash zone on the disk surface. In many cases, the actuator arm may also be latched to further inhibit movement away from the parked position. Therefore, if the portable electronic device is dropped, there is a substantially reduced likelihood that the disk surface and/or head will be damaged. Conversely, if the disk drive is in operation at the time of the fall, the actuator arm is unlatched and the head is likely positioned over the data portion of the disk surface. As a result, damage can easily occur to the disk surface and/or head element.

External shocks such as these yield at least two undesirable outcomes: physical damage of the disk and/or the head and track misregistration. During operation, a shock of sufficient magnitude will cause the head to impact the rotating disk, thereby damaging the magnetic media film, the disk substrate, and/or the head. Further, the shock event generates linear and radial accelerations that apply a moment to the actuator arm. This moment may exceed the ability of the servo system to maintain the read/write head within the allocated tracking error range required for acceptable data integrity, and the servo system may lose track of the actual position of the head element. This problem is exacerbated by increased track density which reduces the acceptable tracking error range. If a shock occurs during the data writing process, the disk drive is in jeopardy of miswriting the data off track, or worse, writing over previously written data on adjacent or nearby tracks.

Thus, it is often advantageous to ensure that the disk drive heads are in a parked position away from the rotating disks prior to impact or positioned over a designated crash zone. In the case of portable computers, this has been accomplished in the past by adding a micro-electro-mechanical-system (MEMS) accelerometer to the computer so that the free fall condition is sensed and the heads are parked prior to impact. For example, some MEMS accelerometers include an outer ring of material that is fixed to a stationary object, such as the motherboard of a computer. A suspended, movable mass is interconnected via a plurality of arms to an inside surface of the outer ring of material. As the MEMS accelerometer is accelerated, inertia causes the resting suspended mass to move relative to the outer ring thereby loading the plurality of arms that connect the mass to the ring. The arms are doped with a piezo-electric material that creates a voltage difference within the arms when loaded. The amount of voltage difference across each of the arms is measured to ultimately yield the magnitude of acceleration. When a disk drive is at rest, for example, sitting on a table, the acceleration measured by the accelerometer is 1 g (where g=force of gravity: 9.8 m/s$^2$). The suspended mass of the MEMS accelerometer will be acted on by gravity and displaced downwardly from the outer ring causing a reading of 1 g acceleration. When the disk drive is dropped, the mass will move relative to the fixed ring, either in line therewith, causing a 0 g acceleration reading, or moving upwardly therefrom, causing a less than 1 g acceleration reading. Thus, when an acceleration indicates less than, or equal to, a predetermined threshold values for a predetermined amount of time, the disk drive is in a free fall condition. Once it is ascertained that the disk drive is indeed experiencing free fall, the voice coil motor that controls the position of the actuator arm is directed to place the actuator arm into a safe location, i.e., to park the actuator arm. When parked, the read/write head or transducer is located away from the rotating disks or over a crash zone so that should the disk drive impact a surface, the head does not strike the disk surface or is already in contact with the surface at a safe zone.

As an alternative, other MEMS accelerometers include a movable mass with a plurality of fingers emanating therefrom that interact with stationary fingers interconnected to a substrate. When at rest, a uniform gap exists between each pair of moveable and stationary fingers. When the mass of the accelerometer moves with respect to the stationary fingers, the gap between each set of fingers is either increased or decreased. The pairs of fingers function as capacitors, altering the space therebetween which changes the capacitance, which, in turn, is measured to identify the magnitude of the acceleration.

The prior art includes the use of accelerometers to detect free fall. U.S. Pat. No. 5,982,573 to Henze ("Henze"), which is incorporated by reference in its entirety herein, discloses a method of sensing acceleration using a MEMS accelerometer and moving the heads away from the disks before an impact occurs. The accelerometer employed is mounted in and secured to the housing of the disk drive. Thus, after a free fall event is detected, a signal is sent from the accelerometer to a processor to cause a signal to be sent to the voice coil motor to park the actuator arm. In other prior art devices, the accelerometer is positioned outside of the disk drive, such as on the motherboard of a computer. In these instances, the command to park the actuator arm must pass through the ATA interface, or similar interface, of the disk drive, and the disk drive must hold the current operation to respond to the command. In each instance, the interface, command, and response time and overhead involved slow or delay any action taken in response to the generated signal. This time lag can be directly correlated to lost reaction time and translates to a minimum drop distance for which corrective action cannot be taken. Conversely, only drops greater than this minimum distance may be detected in time to take corrective action. Unfortunately, even drops less than this minimum distance may produce considerable damage to a disk drive. Moreover, by placing the accelerometer outside of the disk drive, such as on the mother board of a computer, any malfunction of the computer can prevent the signal from the accelerometer from being processed and/or the appropriate corrective signal from reaching the voice coil motor.

In some instances, free falling of an object is accompanied by a rotation movement or tumble. The rotation generates a centrifugal acceleration, which results in the reading of the accelerator to be larger than zero during free fall. As a result, a detection system may not be able to reliably detect free fall with tumble using only the accelerometer as a free fall detection and protection mechanism.

Another known way to detect free fall/tumble event of a disk drive is to measure changes in velocity of the spinning disks. More specifically, it is known that an angular change of the axis of rotation of a spinning object will directly or indirectly alter the speed of that spinning object. In many instances, a portable electronic device experiences a tumbling action as a precursor to or as part of a free fall event. Thus, when a disk drive is experiencing a tumbling action, the rotational velocity of the spinning disks will necessarily change due to a load placed on the spindle from the change in the axis of rotation. One method of detecting free fall accelerations by measuring disk velocity is disclosed by U.S. Pat. No. 6,101,062 to Jenn et al. ("Jenn"), which is incorporated by reference in its entirety herein. Jenn discloses a method of monitoring spindle motor current in order to determine any change in the revolutions per minute (RPMs) of the spinning disks. As a change occurs in the plane in which a spinning disk operates, a load will be placed on the spindle bearings which, in turn, will slow the RPM of the spinning disk. Additional current will be needed to bring the RPMs back to the appropriate level. As a result, by utilizing an additional sensor, a tumble condition may be determined by monitoring the spindle motor current. However, there is a time lag between spindle speed change and motor current change. By monitoring motor current change to detect tumble, some reaction time will be lost for which corrective action cannot be taken.

In some instances, the disk drive may not change orientation as it falls, namely, where the change in angular momentum of the spinning disk is 0, i.e. a non-tumbling free fall. Therefore, no change of angular velocity of the disk drive would be readily apparent using this detection method and the existence of the tumble would not necessarily be detected or would not be detected in a timely manner to take corrective action. In addition, as noted, monitoring spindle motor current may require additional hardware and add to the cost of the disk drive.

Another drawback of the prior art devices and methods for detecting a fall is that they may be fooled to believe that the electronic device is free falling when it is not falling. More specifically, often vibrational loading of the system may be incorrectly identified as a free fall causing an unwanted parking of the head. For example, during travel on a train, airplane, bus or car, or during jogging or dancing, electronic devices are exposed to periodic vibrational accelerations. These vibrations may have an extended duration that may cause a detector to falsely conclude a free fall event is occurring and cause the heads to be parked. Similarly, jitter experienced by a spindle may create a false belief that a tumble event is occurring. Sources of spindle jitter include bearing load variations, electronic noise, windage, and magnetic coupling.

Thus, it is a long felt need in the field of disk drive protection to provide a method of more accurately detecting free fall so that the head can be parked prior to impact under all falling condition. There is also a need to more quickly determine if a disk drive is in free fall in order to reduce the height from which corrective action may be taken. In addition, a system is needed that allows for innocuous vibrations to be disregarded thereby preventing false indicators of a free fall event. The following disclosure describes an improved method of detecting disk drive free fall and tumbling that helps prevent misdiagnosis of these harmful events.

SUMMARY OF THE INVENTION

It is an aspect of the present invention to provide a more reliable, quicker and more precise way to measure free fall. One embodiment of the present invention monitors both the accelerometer output and the spindle speed change to detect free fall and/or tumble events. Another embodiment of the present invention employs a free fall detection algorithm that compares acceleration and the change of acceleration to respective threshold levels to detect a free fall event. These embodiments will detect free falls under different conditions and over shorter distances and thereby protect the disk drive in a wider variety of circumstances. One or more embodiments of the present invention can timely detect falls and complete responsive action to secure the actuator arm within a fall distance of approximately four inches.

The embodiments of the present invention also provide a more precise or sensitive detection system while decreasing false triggering events. For example, all accelerometers have some offset value that will be present when the accelerometer is in a zero gravity state. This offset must be accounted for, as well as other sources of error such as system gain and errors introduced by signal processing components such as digital to analog converters. Together, these offsets or errors plus some additional margin establish a threshold for free fall detection. When the measured acceleration is lower than the threshold for a given period of time, the system determines that free fall is occurring. Increasing the threshold level, and thereby increasing sensitivity, can also increase instances of false triggers. More specifically, the duration of simple vibrations experienced during jogging, dancing, or traveling on a train, bus or car that are below the threshold may cause the system to believe a fall is occurring. On the other hand, reducing the threshold to make a detection system non-sensitive may result in actual free fall event not being detected when the offset of the accelerometer is large. In at least one embodiment of the present invention, it is recognized that the zero gravity offset of an accelerometer is a constant value over a short time. Therefore, monitoring the change in acceleration (the first derivation of acceleration) permits this offset to be removed from the threshold, thereby allowing the threshold level to be reduced by the amount contributed by the offset. It is also recognized that both the acceleration and change of acceleration are close to zero during a non-tumble free fall event. However, the system can not detect free fall by monitoring the change of acceleration alone since the change of acceleration is also close to zero when the disk drive is not falling. In one embodiment of the present invention, the free fall detection system monitors both the acceleration and change of acceleration and compares them to their respective thresholds. When both of them are smaller than their respective thresholds for a given amount of time, a free fall event is determined. A larger threshold for the acceleration can be used to increase the sensitivity to overcome the worst case offset of the accelerometer output, while a smaller threshold for the change of acceleration can be used to reduce false trigger caused by vibration events. Reducing the value of the threshold for change of acceleration reduces the duration of vibration events that are below the threshold, and further reduces the number of false triggering events when a timing window is added to the assessment of potential free falls. Thus, false triggers caused by vibration sources may be eliminated or substantially reduced by measuring the change of acceleration over a time period and comparing those measurements against a lower threshold.

In another embodiment of the present invention, the accelerometer is interconnected to the printed circuit board or a substrate of the disk drive rather than a structure outside of the disk drive, such as the mother board of a laptop computer. When acceleration is detected, critical time is not lost by transmitting the command through an interface between the computer and the disk drive. This allows detection and protection against falls from lower elevations. Further, if the sensor is placed on the computer mother board or at some location outside of the disk drive regardless if the application is in a computer or some other electronic device, the signal to secure the actuator arm or park the head may not be able to be received by the voice coil motor of the disk drive, for example, if the computer is locked up. For this reason, connecting the accelerometer inside the disk drive increases reliability.

In some instances, monitoring acceleration and change in acceleration alone may be insufficient. For example, when the disk drive is falling with change of orientation (rotation) at the same time, the rotation generates an additional centrifugal acceleration. If the rotational speed is high enough, the measured acceleration may be above the threshold or may be below the detection threshold for an insufficient amount of time. As a result, the system will believe the disk drive is not falling.

It is therefore another aspect of the present invention to provide a method of detecting tumbling of a disk drive. Tumbling is a change in orientation of the disk drive relative to the ground, other than solely a change in distance between the disk drive and the ground. Since the disks within a disk drive spin at a high rate of speed, gyroscopic forces are present wherein the conservation of angular momentum dictates that the proportion of disk velocity and angular location of spin axis remains fixed, i.e. resistant to change. When the disk drive is tumbling, the spinning disks must fight gyroscopic forces which cause loads to be applied to the spindle bearings and spindle. Frictional loading of the bearings translates into decreased rotational velocity of the disks. The angular velocity or spin rate of the disks when tumbling is compared to the ideal rotational velocity or spin rate of the disks thereby allowing an identification of tumbling. More specifically, one embodiment of the present invention senses the disk rotational speed by monitoring disk angular position or servo signals from the disk. That is, servo wedges are monitored to assess the rotational speed of the disks. In one embodiment, disk speed changes are measured by comparing the expected disk position and actual disk position, i.e. the "spin error." The assessment of tumble is based on the disk spin error. If the spin error is greater than a predetermined threshold level for a predetermined time, the disk drive is tumbling and the heads are ordered to the parked position. Spin error can also be measured by monitoring the zero-crossing, in the stator motor caused by the back electromotive force (EMF) induced in the stator by the rotation of the permanent magnets associated with the rotor or hub.

It is yet another aspect of the present invention to reduce the effects of spindle jitter that may incorrectly cause a tumble detection system to determine a tumble event is occurring. Spindle "jitter" includes bearing load variations, non-constant loading, seeks, electronic noise, magnetic couplings, etc. Since jitter produces an instantaneous change between expected velocity and measured velocity of the disk spindle, jitter may cause the system to believe it is tumbling. Jitter is typically a problem when spin rates are assessed using analog or hardware controls. As a result, when jitter is present, the threshold that is used to indicate disk drive is tumbling is typically increased to avoid false triggers. Increasing the threshold increases the readings that are required to ensure that the data being collected are not the result of jitter, but are indicative of a tumble condition. Thus, the performance of the system is affected since the detectable drop height of the disk drive must be increased to account for the increased threshold related to filtering out the effects of jitter. To address the problems of jitter caused by analog-based hardware control, one embodiment of the present invention measures spin rate based upon the timing of zero-crossings in the stator induced by back EMF. Rather than monitoring the timing between successive zero crossings, the system assesses an average spin rate over a number of zero crossings. The average spin rate or spindle speed is then compared to a predicted or expected value over a predetermined time interval. By tracking the average disk spin velocity or spin rate with a low pass filter, the offset can be removed from the calculation. If the average spin rate exceeds a threshold value for a predetermined time period, the system determines a tumble event is occurring and corrective action is taken. The threshold value is adjusted, usually increased, to account for the presence of jitter, which is treated as a fixed value. More specifically, the root mean square (RMS) value of spin rate error is calculated and this value is used to adjust the threshold level. As a result, the effects of jitter are accounted for.

In another embodiment of the present invention, digital or firmware-based speed control is used. Systems controlled by firmware may optionally tune out or ignore the presence of jitter. Error only arises from numerical truncation and quantitatively this error is insignificant. As in the hardware-based system, average disk speed is monitored and compared against an expected value. The average speed is compared against a clock, such as a oscillator. The difference is compared to a threshold over a period of time to determine the presence of a tumble event. Because the analog or hardware-based components are not used in this calculation, jitter may be ignored and the threshold set accordingly.

It is yet another aspect of the present invention to provide a disk drive free fall and tumble detection system that may be customized. More specifically, it is contemplated that embodiments of the present invention have the ability to be selectively altered wherein the threshold levels of free fall and/or tumble may be increased, decreased or deactivated and/or the timing windows utilized in association with the threshold levels may be increased or decreased. This aspect has advantages, for example, when the system that embodies the disk drive is used on a train, bus, airplane, etc., where inherent vibrations may falsely indicate a tumbling or free fall condition that would park the head unnecessarily. In other words, the end user may select the desired sensitivity of the detection system.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 8 is a plot of acceleration and change in acceleration, and corresponding threshold levels, over a period of 200 cycles;

FIG. 9 is a companion plot to that of FIG. 8, showing the number of consecutive cycles during which both acceleration and change of acceleration are below the corresponding threshold values.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein

DETAILED DESCRIPTION

Figure 1:
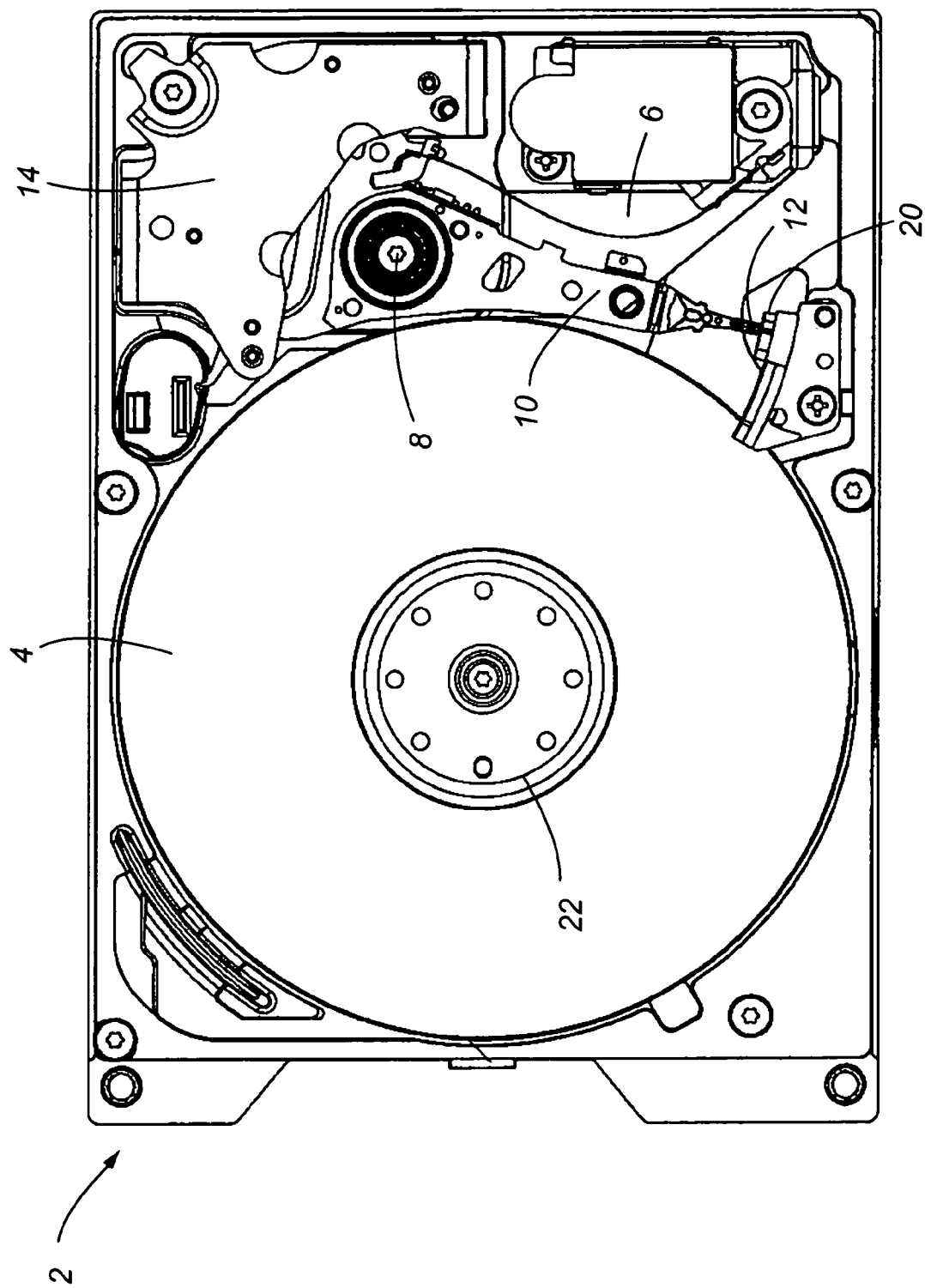
FIG. 1 is a top plan view of a disk drive common in the art.

Referring now to FIG. 1, a partial perspective view of a common disk drive 2 is shown. Hard disk drives 2 employ one or more rotating disks 4 and an actuator assembly 6. The actuator assembly 6 rotates about a pivot 8 to radially position one or more actuator arms 10 relative to the surface of one or more disks 4. A read and/or write element or transducer 12 is positioned at the distal end of each actuator arm. A voice coil motor 14 selectively positions the head and/or write elements over a predetermined portion of a corresponding disk 4 for reading data from or writing data to the disk.

Figure 2:
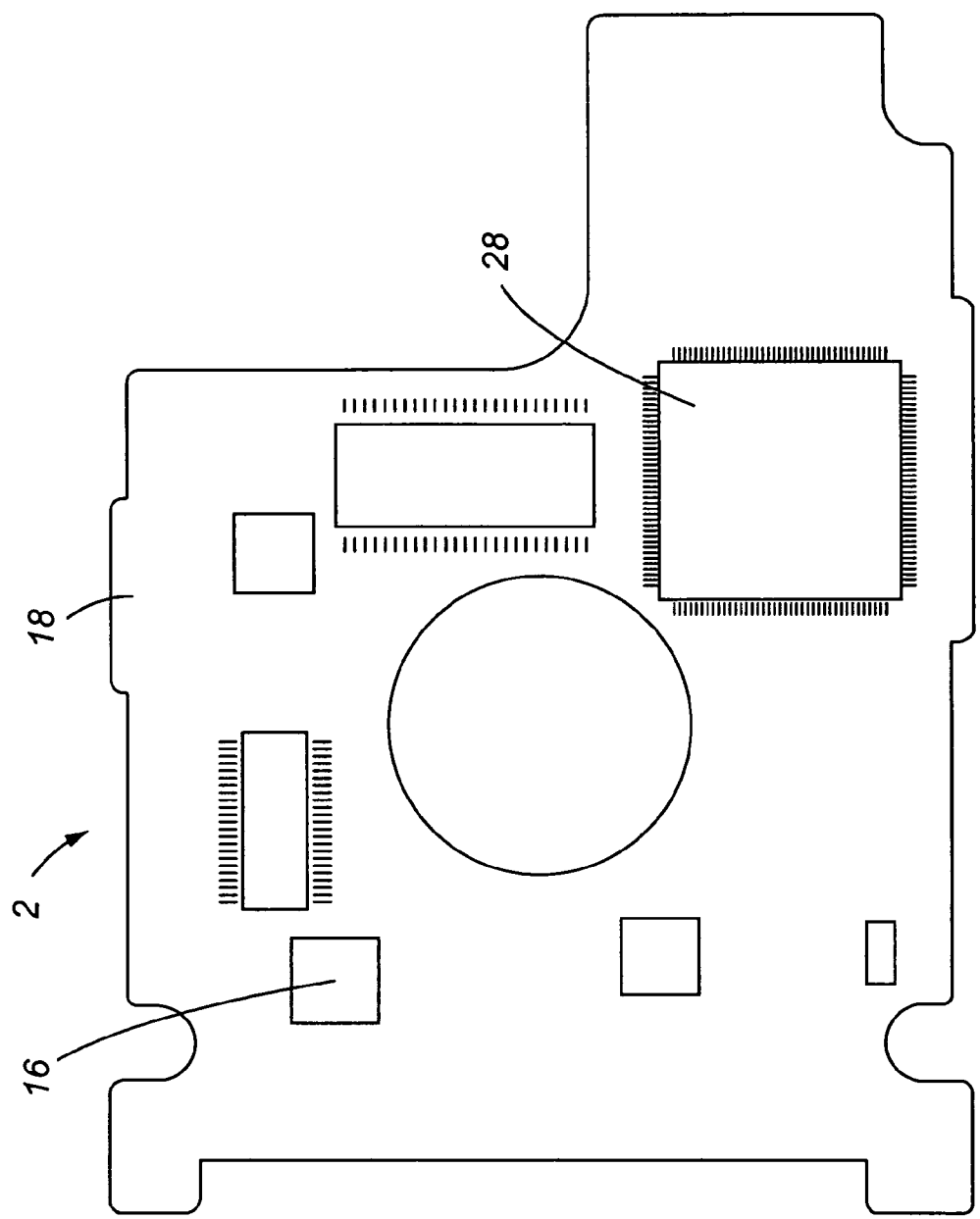
FIG. 2 is a component plan view of the printed circuit board of a disk drive.

One embodiment of the present invention, shown in FIG. 2, further includes an accelerometer 16, preferably a three-axis accelerometer, interconnected to a printed circuit board 18 of the hard disk drive 2 to detect free fall acceleration of the disk drive. Certain implementations of this embodiment monitor acceleration and the change of acceleration over time to detect a free fall condition. Prompt detection of a free fall event allows the actuator arms 10 to be moved to a safe location prior to a potential impact. The safe location may be one in which the actuator arm and transducer are parked on a support structure or ramp 20 removed from the surface of the disk (an unloaded position), or it may be one in which the transducer is parked on a predetermined location or zone 22 on the disk surface. Optionally, the actuator arm may also be latched in placed (unloaded from the ramp). This is desirable since shock loads from an impact may cause damage to the disk 4 and to the heads if the force of the impact is large enough to cause them to collide. In addition, one or more embodiments of the present invention also sense the rotational velocity of the disks 4 to allow detection of tumble, which may also be indicative of a fall. By monitoring acceleration and the change in acceleration over time, and/or the change in rotational velocity of the disks, it can detect both falling without or with slow rotation and falling with fast rotation, and the time it takes to detect a fall is improved. In turn, this allows falls to be detected under a wider variety of conditions, allows falls to detected more reliable and faster, allows responsive preventative action to be successfully taken over broader circumstances and in a shorter time frame, and also allows falls from shorter distances and/or with different rotation speed to be detected and successfully acted upon.

Figure 3:
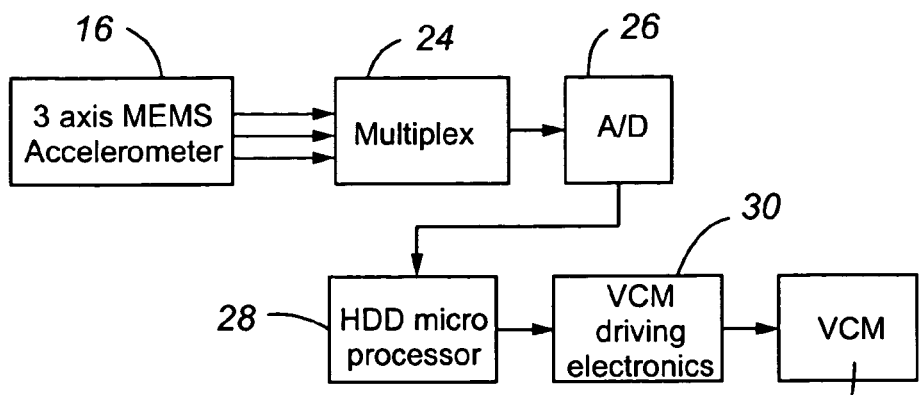
FIG. 3 is a block diagram describing a free fall detection/protection system of one embodiment of the present invention.

Referring now to FIG. 3, a block diagram illustrating a method of utilizing a free fall detection/protection system of one embodiment of the present invention is shown. More specifically, a three axis micro-electro-mechanical system accelerometer (MEMS) 16 is provided along with a multiplexer 24 and an analog to digital (A/D) converter 26. The three axis MEMS accelerometer 16 is designed to sense acceleration in the x, y, and z directions and to feed that information into the multiplexer 24. The acceleration from the multiplexer 24 is then fed into the A/D converter 26 and then fed to the hard disk drive microprocessor 28. If the acceleration meets predetermined free fall conditions, the hard disk drive microprocessor 28 directs a signal to the voice coil motor (VCM) driver electronics 30 instructing the VCM driver electronics to power the voice coil motor 14 to secure the actuator assembly, thereby protecting the system should impact occur.

In one embodiment of the present invention, as shown in FIG. 2, the three axis MEMS accelerometer 16 is mounted on the printed circuit board 18 assembly of the hard disk drive, although it may be mounted at other locations with the disk drive housing. The accelerometer 16 is used to detect free fall conditions by comparing the measured acceleration again a predetermined threshold. For example, when the accelerometer 16 is at rest on a table for example, a 1 g acceleration will be detected due to the force of gravity acting on the accelerometer 16. When the accelerometer is falling, the measured acceleration will be close to 0. Thus, free fall event can be detected when the acceleration is below a predetermined threshold for a given period of time. Usually, due to processes used in manufacturing, properties of the materials used, and the manner in which an accelerometer is attached or mounted on a disk drive, there are likely offsets that must be accounted for, and the threshold can be selected to include the worst case offset plus some additional margin. Since vibration events may also cause the acceleration to be below the threshold momentarily, it is yet another aspect of the present invention that the change of acceleration is also monitored and compared against another threshold to determine free fall condition in order to prevent/reduce false trigger due to vibration events. During a free fall event, the MEMS accelerometer 16 measures the acceleration of the disk drive in the x, y and z directions and feeds the output voltage signals to the multiplexer 24. The multiplexer 24 directs the voltage signals outputted from the MEMS accelerometer 16 to the A/D converter 26. The drive microprocessor 28 acquires the acceleration in x, y, and z directions from the A/D converter 26. Then, the aggregate acceleration and change of acceleration are calculated and compared to their respective preset thresholds. If the acceleration and the change of acceleration are blow their respective thresholds in a predetermined number of consecutive test samples, a free fall event or condition is declared. The number and duration of the test samples is used to vary the sensitivity of the detection system to prevent false indications of free fall. If a free fall event or condition is detected, the microprocessor 28 issues the command to initiate the free fall protection routine to park or unload the transducer. When the transducer is parked or secured, the system continues to monitor acceleration of the disk drive and calculate the aggregate acceleration level. When the aggregate acceleration level is above the threshold over a predetermined number of consecutive samples, the free fall event is deemed over and the transducer loading command is issued. It should be appreciated that the thresholds can be altered to meet particular conditions, as desired by the designer or end user, and that the number and duration of sample periods can also be altered for the same reasons.

Figure 4:
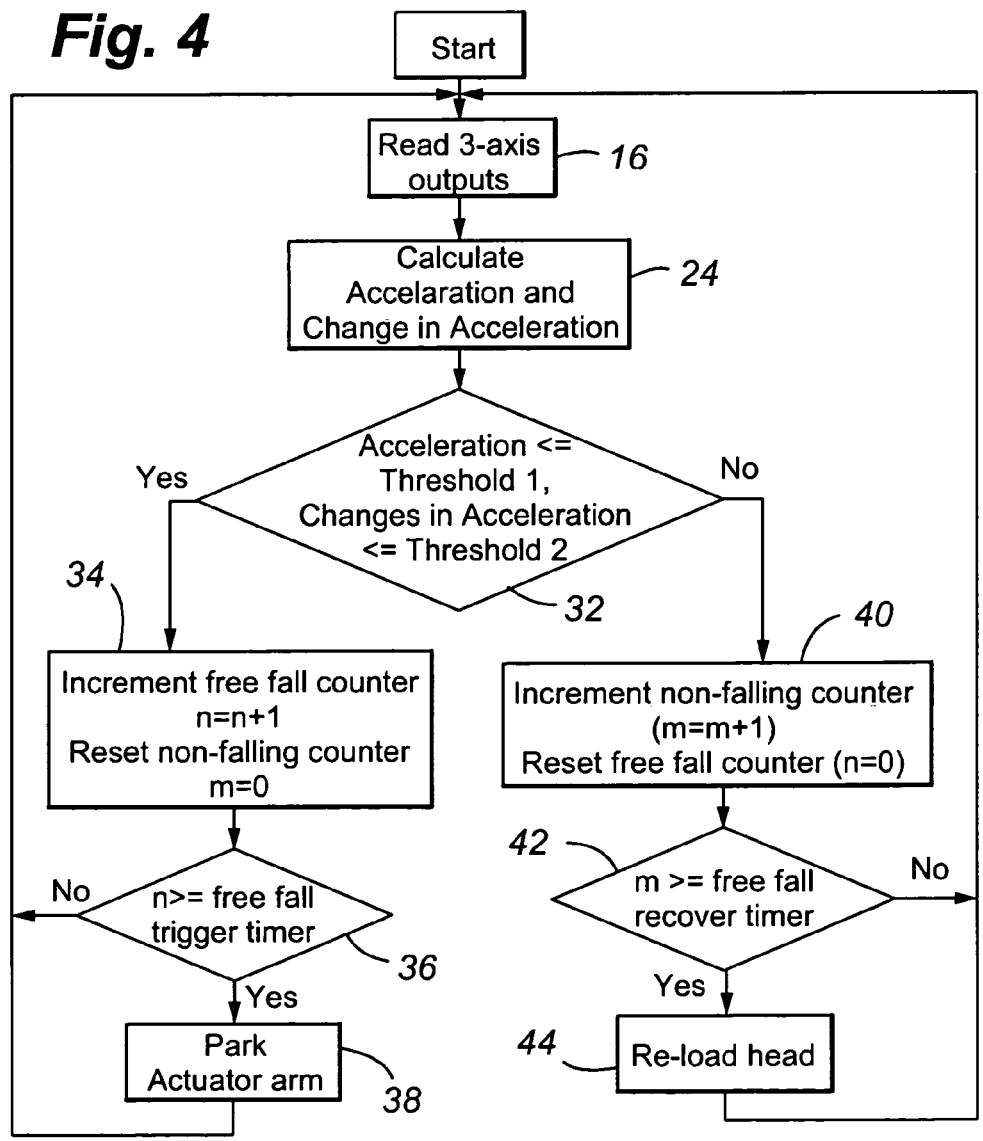
FIG. 4 is a free fall process flow diagram of one embodiment of the present invention.

Referring now to FIG. 4, a flow diagram illustrating the operation of one embodiment of the present invention is shown. More specifically, the three axis outputs from the accelerometer 16 are read by the drive microprocessor 28 to calculate the total acceleration and change of acceleration. The acceleration and change of acceleration are then compared to their respective thresholds at 32. If both the acceleration and change of acceleration are below their respective thresholds (in this case, if they are less than or equal to), a free fall counter is incremented by one (n=n+1) and a non-falling counter is reset (m=0) at 34. The free fall counter number (n) is then compared to a predetermined free fall trigger timer value 36. If the free fall counter (n) is greater than or equal to the free fall trigger timer value, the system concludes that free fall condition is occurring and action is initiated to park or secure the actuator arm. If the free fall counter (n) is less than the free fall trigger timer value, the system assesses that the free fall condition has not been occurring for the requisite predetermined time and no action is taken to unload or secure the actuator arm. The process returns to step 16 and the output of the accelerometer continues to be read and assessed. Should the free fall trigger value be exceeded at step 36, a signal is sent to unload or secure the actuator arm at 38.

If a free fall event does occur and the system parks the transducer at a safe location, the system also monitors when to return the transducer to active operation. The safe location may be parked on a support structure off of the disk or it may be with the transducer parked on a safe or crash zone on the disk surface. If, as a result of continued monitoring, it is determined that the total acceleration and change of acceleration are above their respective thresholds, at step 40 the system determines the free fall event may be concluded and the non-falling counter is incremented (m=m+1) and the free fall counter is reset to (n=0). When the non-falling counter value (m) is greater than or equal to a free fall recovery timer value 42, the system determines the free fall event has concluded and the transducer is reloaded at 44. If the non-free fall counter value (m) is less than the free fall recovery timer value, the system concludes it has not yet sufficiently settled after an impact has occurred and the transducer remains secured. The output of the accelerometer continues to be read and assessed until the value of the free fall recovery timer exceeds a predetermined level, i.e., for a predetermined number of samples or timing windows, at which point the actuator and transducer are loaded and allowed to return to normal operation.

It should be appreciated by those skilled in the art that the threshold values reference herein are determinative of a relative change in state. The discussion and embodiments addressed herein are based upon a monitored value being less than or equal to a threshold value. The system could also be set up such that the monitored value must be equal to or exceed the threshold value.

Figure 5:
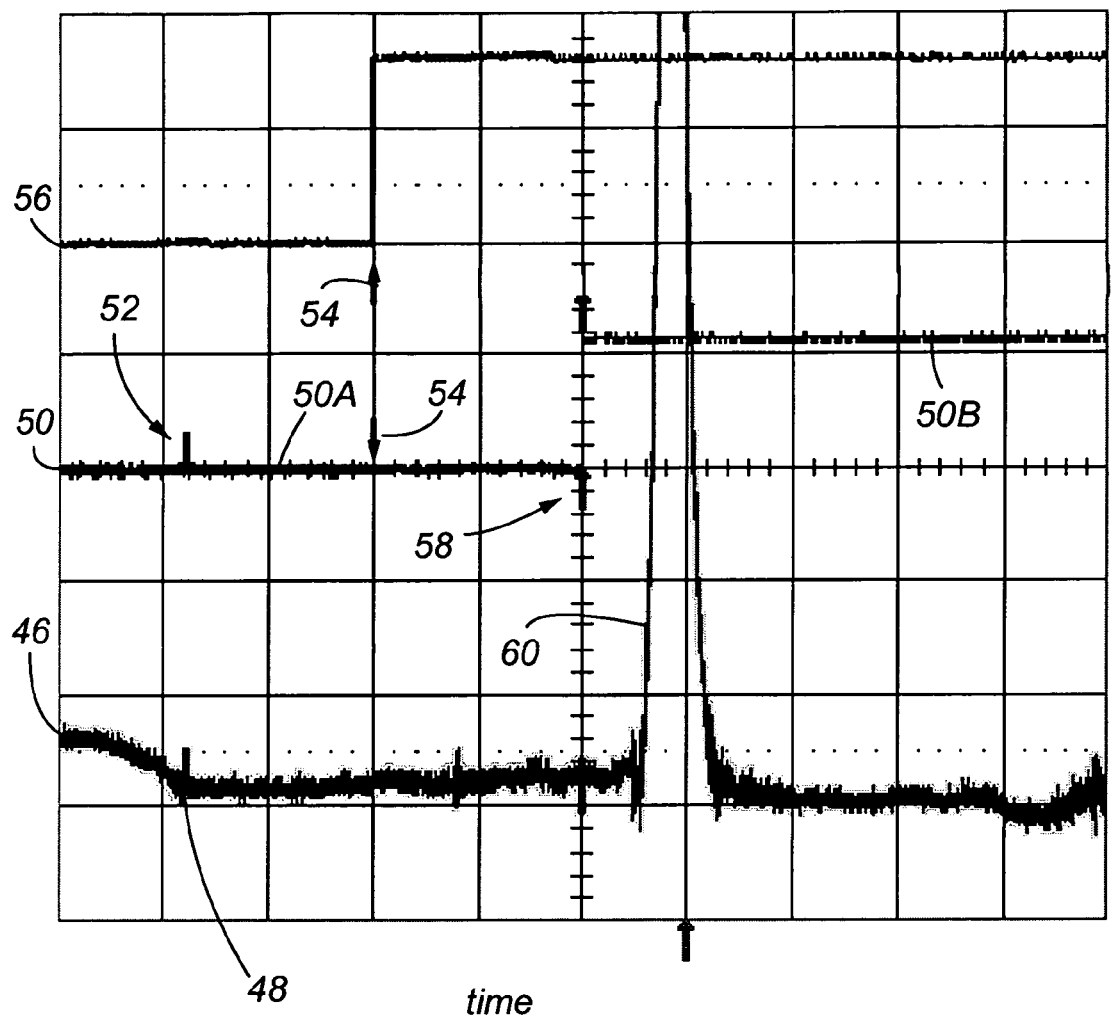
FIG. 5 is an oscilloscope output with three separate traces indicative of external acceleration, head position and free fall detection.

Referring now to FIG. 5, an oscilloscope output of a test of one embodiment of the present invention utilizing a MEMS three axis accelerometer is shown. Each grid represents fifty milliseconds (ms) of elapsed time. External acceleration is shown as the bottom trace 46 wherein arrow 48 indicates the beginning of a free fall condition, i.e., the system determines at step 32 of FIG. 4 that the thresholds condition is satisfied. Trace 50 indicates the status of the voice coil motor load/unload signal that is issued from the microprocessor 28 of the hard disk drive. This is a binary signal, either the actuator arm is loaded and in operation or it is in a unloaded condition with the actuator arm and transducer are parked off the surface of the disk. Alternatively, the transducer could be positioned over a safe zone 22 on the disk. In this example, the cumulative time to trigger the free trigger timer 36 is approximately 90 ms. That is, when consecutive acceleration and change of acceleration measurements or samples taken in step 34 remain equal to or below their respective predetermined thresholds for at least 90 ms, a free fall condition is declared. Viewing trace 50, arrow 52 is aligned with arrow 48 and indicates when the system first detected both acceleration and change of acceleration are below their respective thresholds and, therefore, arrow 52 represents the beginning of the timing cycle of the incremental free fall counter 34. Trace 56 indicates when the system determines a free fall is occurring. Arrow 54 represents the point in time when the free fall trigger counter 34 exceeds the free fall trigger timer value. Trace 56 moves from a low state to a high state as indicated by arrow 54. In response, a signal is sent to the voice coil motor 14 to park or otherwise secure the actuator arm 10 and the transducer 12. In the embodiment used in this example, the parking operation takes approximately 100 ms to perform as indicated by trace 50. Arrow 58 represents the point in time that the actuator arm reaches its secure or parked location. This is also illustrated by trace 50 going "high." Accordingly, after about 190 ms from the initial drop of the disk drive (arrow 52 to arrow 58), the voice coil motor is unloaded into its parked position. About 50 ms thereafter, the impact is shown as a spike 60 on trace 46. In this example, the free fall detection system can determine free fall condition and finish head parking for a fall height of about 7 inches. By further reducing free fall detection time window and using a faster emergency head unload velocity, the free fall detection system in this invention is capable of protecting fall height under 4 inches.

Figure 6:
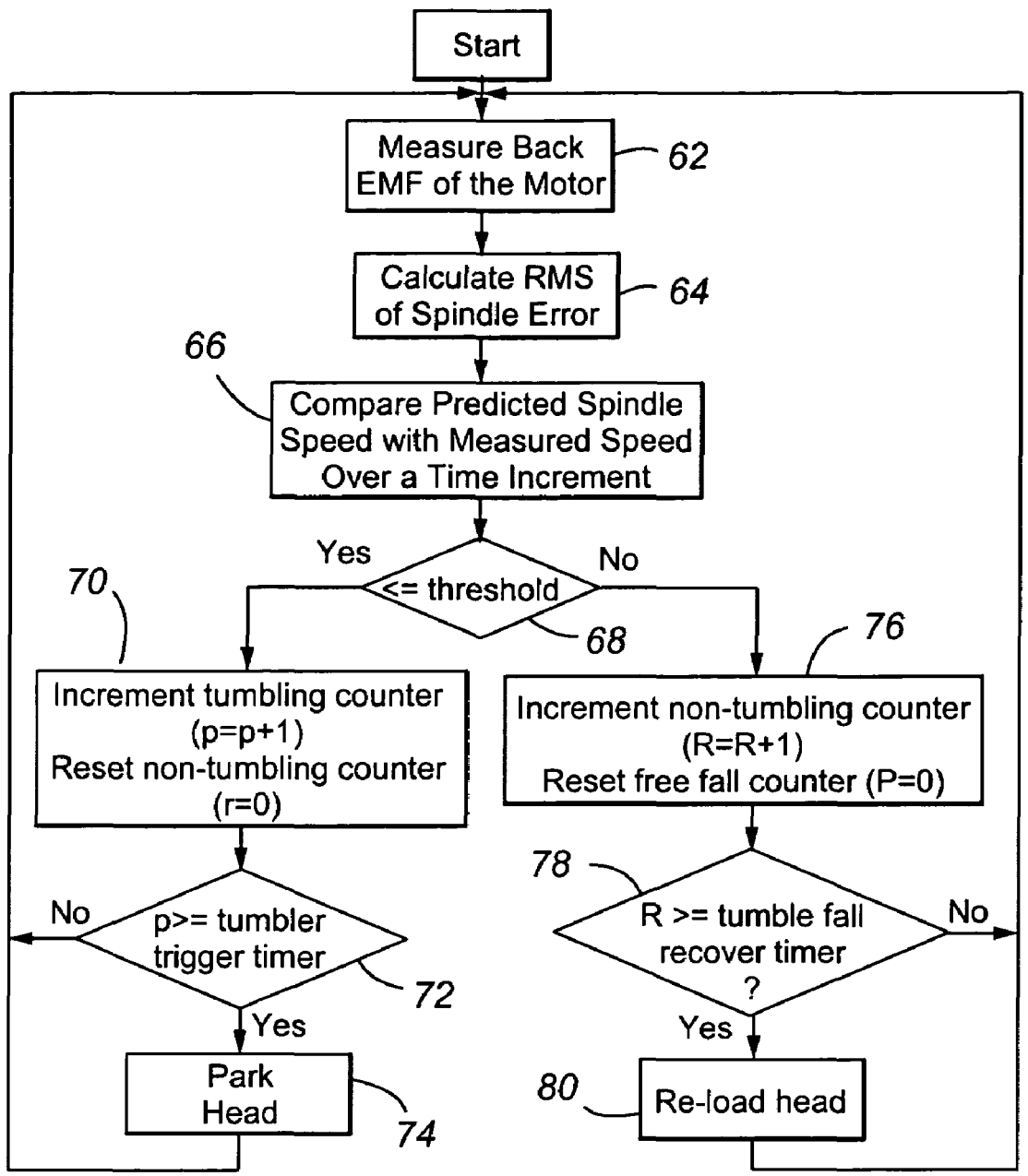
FIG. 6 is a tumble process flow diagram of one embodiment of the present invention.

Referring now to FIG. 6, a flow diagram of one method of detecting a tumbling disk drive is shown. In one embodiment, the system assesses changes in the spin rate or velocity of the disk or spindle motor as determinative of a tumble event. This can be accomplished using servo data to compare actual spin rates to expected or predicted spin rates. A difference or change in actual spin rates versus intended spin rates indicates that a load is being applied to the spin motor which, in turn, is indicative of a change in orientation of the plane of the disk, e.g., a tumble event. One drawback to relying upon servo data is that servo data is not always available. In some circumstances, servo systems are intermittently turned off as a way to conserve battery power. If the drive were to tumble with the servo system off or in a sleep mode, there would be no data to assess the occurrence of the tumble event. In other instances, there may be an error in the servo system, such as losing synchronization between the transducer and disk. As a result, the drive will go into an error recovery mode and data representative of a potential tumble event will not reach the detection system.

Alternatively, the system may assess tumble events based upon the back electromotive force (EMF) of the spin motor. In normal operations, a controller associated with the spindle motor monitors the operations of the spindle motor in order to maintain spindle velocity or spin rate at a desired value. As the hub, disk and spindle spin in normal operations, the permanent magnets on the rotor and/or hub also generate back EMF in windings of the individual stator teeth. Thus, the same controller may also be used to monitor for loads applied to the spindle. The voltage associated with the individual stator coils will pass through a zero voltage state as the permanent magnets pass by. The rate at which the zero crossings occur can be used to determine changes in spin rate. Unlike the situation with using servo data, back EMF data is virtually always available. The system could monitor the time between successive zero crossings, although, due to imperfections in the motor components, it is preferable to make calculations over longer time periods, such as at least one revolution. This provides a more reliable average spin rate and reduces the effects of such variations.

In determining spin rate based upon back EMF, the system may utilize analog data or digital data. Use of digital data is preferred because analog data inherently includes errors. For example, amplifiers and other electronic hardware components include offsets, similar to the accelerometers previously discussed. As a result, an analog or hardware-based system should calculate an average offset error and include that number in setting the tumble detection threshold. The root mean square of the spin error provides a good approximation of the quantity of the offset. Alternatively, in a digital-based system, error is introduced by truncation of numbers as part of the digital processing, and these errors can be effectively removed with proper numerical scaling. In a digital system, a clock or oscillator is used for determining spin rate. Offsets in the electronic components are not used in determining variations in spin rate and, as a result, the offsets are not part of the system.

Turning to FIG. 6, at 62 the system assesses back EMF of the stator. Next, in an analog-based system, the root mean square (RMS) of the spin rate error is calculated at 64. An intended or predicted spin rate is compared with the error over a predetermined time span at 66. If the difference between the predicted speed and the RMS of any detected error exceeds a predetermined threshold at 68, at 70 the tumbling counter is incremented (p=p+1) and the non-tumbling counter is set to 0 (r=0). The tumble counter number (p) is then compared to a predetermined value, the tumble trigger timer value 72. This process is repeated until the counter value (p) exceeds the tumble trigger timer value. Once the tumbling counter value (p) is equal to or exceeds the tumbler trigger timer value, at 74 the processor 28 directs to VCM driver electronics 30 to secure the transducer as previously described. If the difference between the predicted or intended spindle speed and the RMS of the error does not equal the threshold at 76, a non-tumbling counter is incremented (r=r+1) and the tumbling counter is set to 0 (p=0). Once the non-tumbling counter is equal to or exceeds the tumble recovery timer value 78, the system ascertains that a tumbling event is over and the transducer is reloaded at 80. If, however, the non-tumbling counter (r) is less than the tumble recovery timer value, the process is repeated to detect the presence of a continuing tumble event. If the system were digital-based, step 64 would be eliminated. At 66, the spindle velocity would be compared to the clock over a time interval.

Figure 7A:
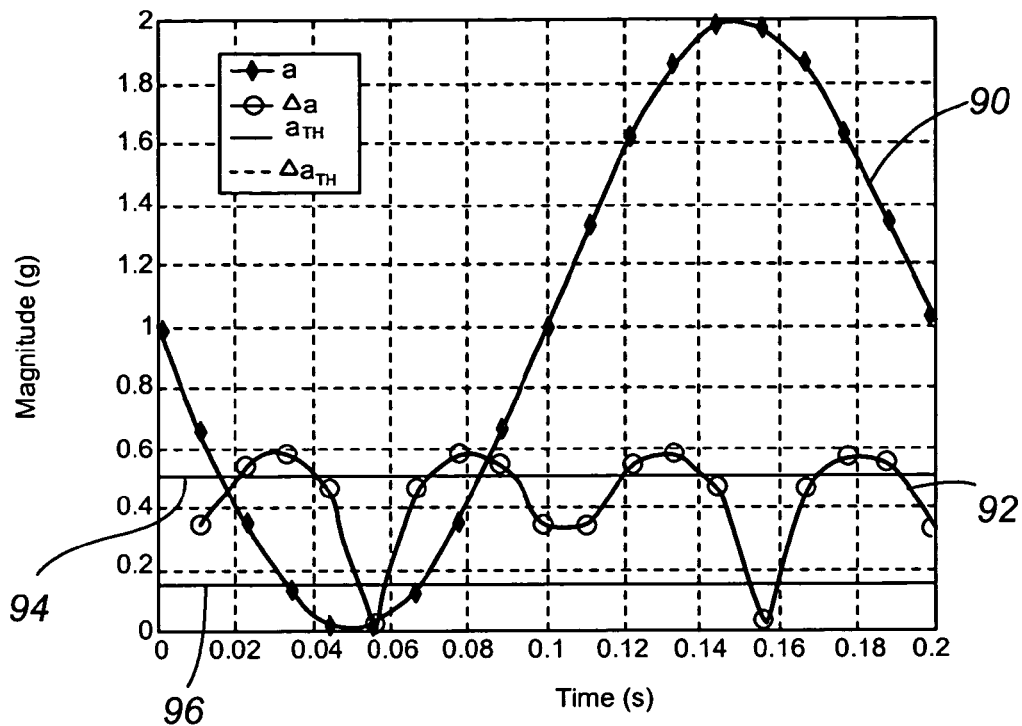
FIG. 7A is a plot of external vibrations of 1 g at 5 Hz experienced by a disk drive.
Figure 7B:
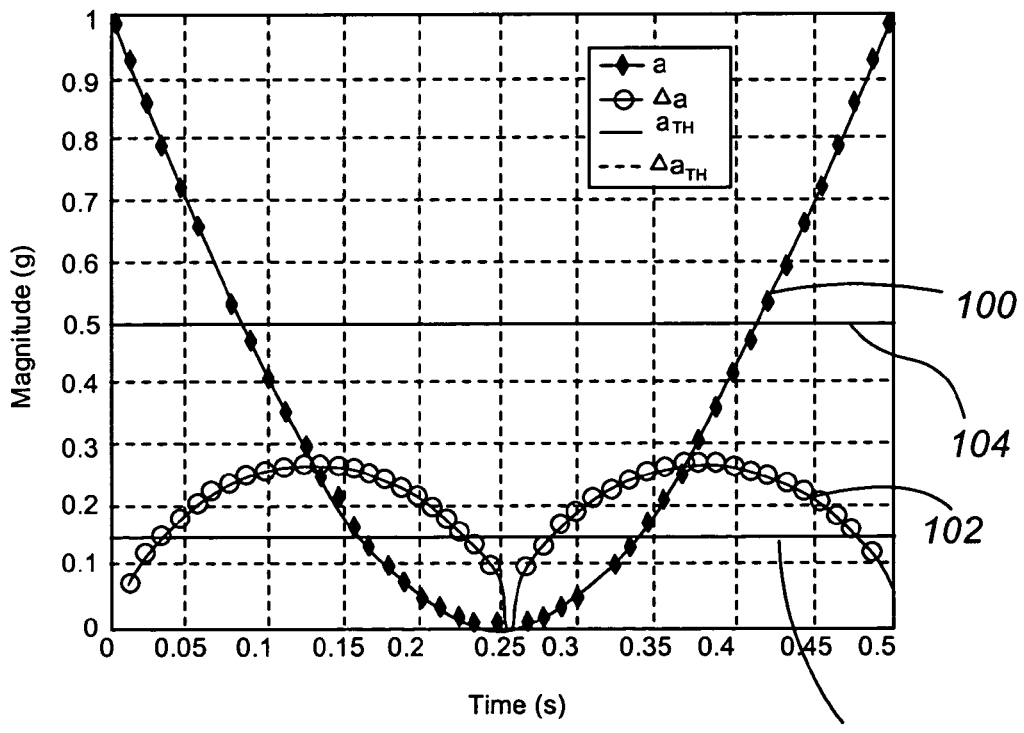
FIG. 7B is a plot of external vibrations of 1 g at 1 Hz experienced by a disk drive.

Referring now to FIGS. 7A and 7B, two traces are shown in each plot, acceleration 90 and the first derivative of acceleration 92. The purpose is to illustrate the effects of vibrations and the potential of vibrations to cause the detection system to falsely believe a free fall event is occurring. Often harmless vibrations that would not cause damage to the transducers or the spinning disk are present, for example, during a plane, train, bus or car ride. Vibration-induced accelerations may, however, trigger a false indication of free fall wherein the actuator arm is unnecessarily parked. FIG. 7A represents a 1 g acceleration based upon a 5 Hz sinusoidal vibration applied to a disk drive, and FIG. 7B represents a 1 g acceleration based upon a 1 Hz sinusoidal vibration applied to the same disk drive. The x axis is time, marked in seconds, and the y axis is acceleration measured by gravity. Although each of these vibrations may cause that the acceleration to be below a free fall threshold, neither of these vibrations should result in a false trigger causing a parking of the actuator arm. In order to prevent unnecessarily parking the actuator arm due to a false trigger, at least some of the embodiments of the present invention monitor two thresholds: one related to acceleration and a second related to the change of acceleration. Doing so limits the potentially misleading effect of vibrations on the disk drive.

In addition to dealing with the effects of vibrations, as well as establishing or tuning the sensitivity of the detection system, inherent errors within an accelerometer must be accounted for. These inherent errors, i.e. "offsets," result from imperfections in materials, manufacturing and processing of the accelerometer, the manner in which the accelerometer is affixed to the disk drive, variations in environmental conditions, such as temperature, and other factors. The magnitude of the offset may vary from one accelerometer to the next. Nonetheless, the threshold value for the detection system must account for these offsets. For example, the accelerometer used in this invention has an offset of approximately 0.25 g per axis. The magnitude of acceleration is represented by the equation:

$$a=\sqrt{a_x^2+a_y^2+a_z^2}$$

Therefore, calculating the offset for this accelerometer in a zero gravity state yields an offset of up to 0.43 g. To accommodate other offset factors such as gain variations and analog to digital errors, the total offset was rounded up to 0.5 g. This offset is represented in FIGS. 7A, B as the acceleration threshold ($a_{th}$) 94. It should be appreciated that the offset can change from one accelerometer to the next. As can be seen, the acceleration curve 90 remains below the threshold 94 for approximately 70 ms. Therefore, to prevent a vibration such as this from generating a false trigger of the detection system was to monitor acceleration only, the time period for determining triggering a free fall event must be greater than 70 ms. Increasing the time period necessarily increases the minimum fall distance that can be detected and still successfully secure the actuator arm and thereby limits the detection system. However, when the derivative of the acceleration is monitored, in combination with monitoring acceleration, a smaller threshold 96 can be selected as the threshold for the derivative of the acceleration. This is because the offset errors inherent in the detection equipment, having a magnitude of up to 0.5 g in this example, may be nullified by use of the first derivative calculation. More specifically, one skilled in the art will appreciate that the derivative of a constant, for example the inherent offset error in the acceleration measurement, is zero. Accordingly, when monitoring the first derivative of acceleration, the threshold may be reduced, as is shown by new threshold 96. In comparison to acceleration curve 94, the curve for the derivative of the acceleration 96 is beneath the new threshold 96 only about 10 ms. Thus, by monitoring both the acceleration and change of acceleration permits the system also to reduce the timing window for determining a free fall event is occurring. Accordingly, a drop from a lower distance may be detected without a high probability of false indicators causing unnecessary actuator parking.

FIG. 7B is similar to FIG. 7A, but represents a 1 g acceleration based upon a 1 Hz vibration. Acceleration is represented by curve 100, the rate change of acceleration is represented by curve 102, the threshold value based upon offsets is represented by line 104, and the lower threshold based upon the first derivative curve 102 is represented by line 106. The higher threshold is the same as in FIG. 7A, 0.5 g. Here, the acceleration curve 100 is below the threshold 104 for about 325 ms which, depending upon how the threshold 32 and free fall timer 36 are set, see FIG. 3, may indicate a free fall. However, when the first derivative of the acceleration 102 is employed, the threshold 106 may be lowered to about 0.15 g. The time period over which curve 102 is below the threshold 106 is about 75 ms. As a result, false indications of drops due to harmless vibrations may be significantly reduced, and the minimum height to detect free fall and safely park the actuator may be reduced without increasing false triggers.

FIGS. 8 and 9 illustrate experimental test results of vibration events correlated to FIG. 7A. The data is generated by a 1 g acceleration based upon a 5 Hz sinusoidal vibration. FIG. 8, like FIG. 7A, shows an acceleration curve 110 and a corresponding threshold 112, and a change in acceleration curve 114 and a corresponding threshold 116. FIG. 9 shows the activity of the free fall counter 34 (see, FIG. 3). As illustrated, eight consecutive sample periods below the threshold are required to trigger parking of the actuator. In no instance were more than five consecutive sample counts detected. Accordingly, the vibration did not cause a false trigger of a free fall event. In addition, based upon this data, the system could be further tuned to detect free falls from shorter distances without increasing the sensitivity to false triggers. In particular, the number of successive counts needed to trigger securing of the actuator arm may be reduced from eight to six consecutive sample periods below the thresholds to trigger a free fall response.

Figure 10:
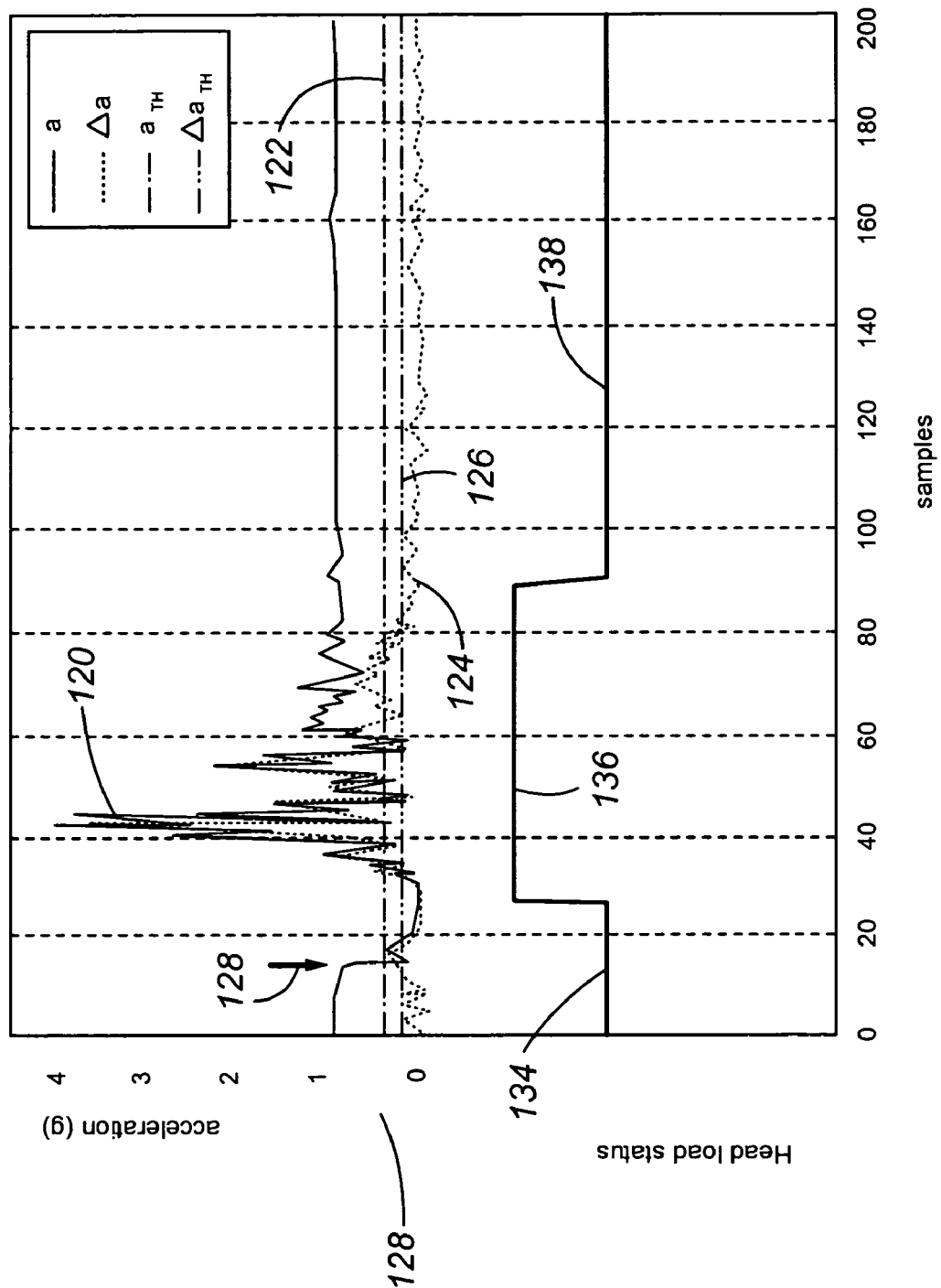
FIG. 10 is a plot of a free fall event, showing acceleration and change in acceleration compared to corresponding thresholds, and head position based upon free fall detection.

FIG. 10 provides an overall view of the operation of one embodiment of the present invention when subjected to a free fall event. The upper traces represent a free fall event, including a one-time physical shock. Trace 120 represents acceleration and line 122 the corresponding threshold. Trace 124 represents the change in acceleration and line 126 its corresponding threshold. Arrow 128 indicates the transition point from a steady state to a free fall. Trace 132 represents the load/unload status of the actuator based upon free fall detection. As initially seen at 134, the actuator is in a loaded state. When the system detects a free fall, the actuator moves to a parked or unloaded state as shown at 136. The actuator remains parked until recovery timer 40 (FIG. 3) determines that the actuator arm may be loaded. Loading of the actuator is shown at 138 on trace 132.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A method of preventing damage to a disk drive, the disk drive having at least one rotating disk and an actuator arm movable relative to the surface of the rotating disk to position a read and/or write element at select positions over the surface of the disk, the method comprising:
   a. sensing the acceleration of the disk drive over time to determine free fall event;
   b. simultaneously sensing the change in spin rate of the rotating disk over time to determine free fall event; and
   c. initiating procedures to secure the actuator arm if free fall event is determined.

2. The method of claim 1, wherein sensing the acceleration of a disk drive over time comprises taking multiple samples of the acceleration over time.

3. The method of claim 1, further comprising:
   a. comparing the acceleration of the disk drive to a first threshold value;
   b. calculating the change of acceleration and comparing the change of acceleration to a second threshold value; and
   c. determining free fall condition when the acceleration is below said first threshold value over a first predetermined period of time and the change of acceleration is below said second threshold value over a second predetermined period of time.

4. The method of claim 1, wherein initiating procedures to secure the actuator arm comprises sending a signal to the voice coil motor to move the actuator arm.

5. The method of claim 4, wherein said signal is sent to said voice coil motor if one or both of the following occurs: the acceleration surpasses said first threshold value for said first predetermined period of time and the change of acceleration surpasses said second threshold value for a second predetermined period of time.

6. The method of claim 1, further comprising:
   a. sensing tumble of the disk drive by sensing the change in spin rate of the rotating disk over time;
   b. comparing the change in spin rate to a third threshold value; and
   c. initiating procedures to secure the actuator arm if the change in spin rate exceeds a third threshold value for a third predetermined period of time.

7. The method of claim 6, wherein said signal is sent to said voice coil motor if at least one of the following occurs: the acceleration surpasses said first threshold value for said first predetermined period of time, the change of acceleration surpasses said second threshold value for a second predetermined period of time, and the tumble detector surpasses the third threshold value for the third period of time.

8. The method of claim 1, further comprising moving the actuator arm to position the read and/or write element over a data free zone of the disk if at least one of the following occurs: the acceleration surpasses said first threshold value for said first predetermined period of time, the change of acceleration surpasses said second threshold value for a second predetermined period of time, and the tumble detector surpasses the third threshold value for the third period of time.

9. The method of claim 1, further comprising loading the actuator arm on a support structure removed from the surface of the disk if at least one of the following occurs: the acceleration surpasses said first threshold value for said first predetermined period of time, the change of acceleration surpasses said second threshold value for a second predetermined period of time, and the tumble detector surpasses the third threshold value for the third period of time.

10. The method of claim 9, further comprising detecting if the acceleration surpasses said first threshold value for said first predetermined period of time and the change of acceleration surpasses said second threshold value for a second predetermined period of time and loading the actuator arm on a support structure removed from the surface of the disk in less time than it take for the disk drive to fall four inches.

11. The method of claim 3, wherein the first and second threshold values are changeable by the end user to vary the sensitivity of the free fall detection system.

12. The method of claim 3, further comprising varying one or both of the first and second time period over which the acceleration and change of acceleration are assessed.

13. The method of claim 3, further comprising varying one or both of the time period over which the acceleration and/or the change of acceleration is assessed.

14. The method of claim 1, wherein sensing the acceleration of a disk drive comprises using an accelerometer.

15. The method of claim 14, wherein the accelerometer is a three-axis accelerometer attached inside the housing of disk drive.

16. The method of claim 6, wherein at least one of the first, second and third threshold values are changeable.

17. The method of claim 6, wherein at least one of the predetermined time periods associated with said first, second and third threshold values for initiating procedures to secure the actuator arm is changeable.

18. The method of claim 6, wherein sensing the change in spin rate comprises comparing the actual spin rate against a clock.

19. The method of claim 18, wherein sensing the change in spin rate comprises assessing an average spin rate based upon back electromotive force induced in the stator motor.

20. A disk drive comprising:
   a. a housing;
   b. at least one rotatable storage disk mounted within the housing, said disk having an inner and outer circumference and a data zone disposed between the inner and outer circumference;
   c. an actuator arm movable relative to the disk to position a read and/or write element radially across the disk;
   d. a sensor mounted within the housing to sense if the disk drive is falling from a first elevation to a second elevation by monitoring acceleration of the disk drive over time;
   e. fall detection means for assessing the acceleration and change of acceleration, for determining if the acceleration is below a first threshold over a first period of time and change of acceleration is below a second threshold over a second period of time, and for outputting a first signal if the acceleration is below said first threshold over said first period of time and change of acceleration is below said second threshold over said second period of time; and f. control means for causing movement of the actuator arm in the event that said first signal is generated.

21. The disk drive of claim 20, further comprising tumble detection means for sensing the spin rate of the rotating disk over time and determining if the spin rate exceeds a third threshold value over time, and for outputting a second signal if the spin rate exceeds the third threshold value over a third predetermined period of time.

22. The disk drive of claim 21, wherein said control means further comprises means for causing movement of the actuator arm in the event that said second signal is generated.

23. The disk drive of claim 20, wherein the sensor is mounted on or inside the housing.

24. The disk drive of claim 20, wherein the first and second time periods are of a different duration.

25. The disk drive of claim 20, wherein the sensor is a three-axis accelerometer.

26. The disk drive of claim 20, further comprising adjustment means for changing the duration of one or both of the first and second predetermined time periods.

27. The disk drive of claim 20, further comprising a hub on which the at least one rotatable disk is mounted, at least one permanent magnet associated with said hub, a stator comprising a plurality of electromagnets mounted within the housing of the disk drive, and a feed back loop operatively associated with the stator, said feed back loop monitoring variations in the spin rate of the at least one rotating disk based upon back electromotive force induced in the stator by said at least one permanent magnet.

28. The disk drive of claim 20 further comprising a servo controller for monitoring the position of the read and/or write element relative to the surface of the disk and for monitoring variations in the spin rate of the at least one rotating disk.

29. The disk drive of claim 20, wherein said control means further comprises means for causing movement of the actuator arm in the event that said first or second signal is generated.

30. The disk drive of claim 20, wherein said means for causing movement of the actuator arm in the event that said first signal is generated further causes the read and/or write element to be moved to a position off of the data zone.

31. The disk drive of claim 30 wherein the position of the read and/or write element is off of the disk.

32. The disk drive of claim 26, wherein said adjustment means permits changing the duration of the third predetermined time period.

33. The disk drive of claim 21, wherein said control means further comprises means for causing movement of the actuator arm in the event that said second signal is generated.

34. A method for detecting a falling disk drive, comprising:
   a. sensing acceleration of the disk drive using an accelerometer;
   b. calculating the change in acceleration over time;
   c. comparing the acceleration to a first threshold value for over a first series of predetermined time periods;
   d. comparing the change in acceleration over time to a second threshold value over a second series of predetermined time periods;
   e. monitoring the spin rate of the disks in the disk drive;
   f. comparing the spin rate to a clock value;
   g. determining if the spin rate values from the expected value by a third threshold value over a third series of predetermined time periods;
   h. generating a signal if any of the first, second or third threshold values are exceeded over the first, second or third time periods, respectively.

35. The method of claim 34, wherein at least one of the first, second and third threshold values are variable.

36. The method of claim 34, wherein at least one of the first, second and third predetermined time periods are variable.

37. The method of claim 34, wherein the disk drive comprises an actuator arm that moves relative to the surface of the disk and the actuator arm comprises a read and/or write element for reading data from and/or writing data to the disk, further comprising moving the read and/or write element to a new position following the step of generating a signal if any of the first, second or third threshold values are exceeded over the first, second or third time periods, respectively.

38. The method of claim 37, wherein the new position comprises a position in which the read and/or write element is loaded on a ramp off of the disk surface.

39. The method of claim 37, wherein the new position comprises a position in which the read and/or write element is positioned over a safe zone on the disk.

40. The method of claim 37, further comprising securing the actuator arm.

41. A method for detecting a falling disk drive, comprising:
   a. sensing acceleration of the disk drive using an accelerometer;
   b. calculating the change in acceleration over time;
   c. comparing the acceleration to a first threshold value for over a first series of predetermined time periods;
   d. monitoring the spin rate of the disks in the disk drive;
   e. comparing the spin rate to a clock value;
   f. determining if the spin rate varies from the expected value by a second threshold value over a second series of predetermined time periods; and
   g. generating a signal if either of the first or second threshold values are exceeded over the first or second time periods, respectively.

42. The method of claim 41, wherein monitoring the spin rate of the disks comprises not monitoring control current of the spin motor.

43. The method of claim 41, wherein sensing acceleration over time comprises taking multiple samples of the acceleration over time.

44. The method of claim 41, further comprising positioning the actuator arm in a safe position following generation of a signal.

45. The method of claim 44, wherein the safe position is a loaded position with the head off of the disk.

46. The method of claim 44, wherein the safe position is a position with the head over a designated zone of the disk.

47. The method of claim 41, wherein one of the first and second threshold values are changeable.

48. The method of claim 41, wherein both the first and second threshold values are changeable.

49. The method of claim 41, wherein one of the first and second predetermined time periods are changeable.

50. The method of claim 41, wherein both the first and second predetermined time periods are changeable.

51. The method of claim 41, wherein sensing the change in spin rate comprises assessing an average spin rate based upon back electromotive force induced in the stator motor.

52. A disk drive comprising:
a. a housing;
b. at least one rotatable storage disk mounted within the housing, said disk having an inner and outer circumference and a data zone disposed between the inner and outer circumference;
c. an actuator arm movable relative to the disk to position a read and/or write element radially across the disk;
d. a sensor mounted within the housing to sense if the disk drive is falling from a first elevation to a second elevation by monitoring acceleration of the disk drive over time;
e. fall detection means for assessing the acceleration and change of acceleration, for determining if the acceleration is below a first threshold over a first period of time and change of acceleration is below a second threshold over a second period of time, and for outputting a first signal if the acceleration is below said first threshold over said first period of time and change of acceleration is below said second threshold over said second period of time;
f. tumble detection means for sensing the spin rate of the rotating disk over time and determining if the spin rate exceeds a third threshold value over time, and for outputting a second signal if the spin rate exceeds the third threshold value over a third predetermined period of time; and
g. control means for causing movement of the actuator arm in the event that either or both of said first and second signals are generated.

53. The disk drive of claim 52, wherein said first and second time periods are of a different duration.

54. The disk drive of claim 53, wherein said sensor is a three-axis accelerometer.

55. The disk drive of claim 52, wherein one or more of said first, second and third threshold values are changeable.

56. The disk drive of claim 52, wherein one or more of said first, second and third predetermined periods of time are changeable.

* * * * *